US011962063B2

(12) United States Patent
Hsu et al.

(10) Patent No.: US 11,962,063 B2
(45) Date of Patent: Apr. 16, 2024

(54) ANTENNA STRUCTURE AND ELECTRONIC DEVICE USING SAME

(71) Applicant: Chiun Mai Communication Systems, Inc., New Taipei (TW)

(72) Inventors: Cho-Kang Hsu, New Taipei (TW); Min-Hui Ho, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 164 days.

(21) Appl. No.: 17/226,406

(22) Filed: Apr. 9, 2021

(65) Prior Publication Data

US 2021/0320392 A1 Oct. 14, 2021

(30) Foreign Application Priority Data

Apr. 10, 2020 (CN) ......................... 202010280641.2

(51) Int. Cl.
*H01Q 1/52* (2006.01)
*H01Q 1/16* (2006.01)
*H01Q 1/24* (2006.01)
*H01Q 1/50* (2006.01)

(52) U.S. Cl.
CPC ............... *H01Q 1/16* (2013.01); *H01Q 1/243* (2013.01); *H01Q 1/50* (2013.01)

(58) Field of Classification Search
CPC ............ H01Q 1/16; H01Q 1/243; H01Q 1/50; H01Q 1/44; H01Q 5/328; H01Q 9/42; H01Q 13/10; H01Q 1/521; H01Q 1/241
See application file for complete search history.

(56) References Cited

U.S. PATENT DOCUMENTS

| | | | | |
|---|---|---|---|---|
| 8,836,587 | B2 * | 9/2014 | Darnell | H01Q 1/50 343/702 |
| 10,396,438 | B1 * | 8/2019 | Smith | H01Q 1/2283 |
| 10,665,937 | B2 * | 5/2020 | Islam | H01Q 7/00 |
| 2012/0176278 | A1 * | 7/2012 | Merz | H01Q 1/243 343/702 |
| 2016/0056531 | A1 * | 2/2016 | Lee | H01Q 1/243 343/702 |
| 2016/0149290 | A1 * | 5/2016 | Park | H01Q 1/44 343/702 |
| 2017/0033441 | A1 * | 2/2017 | Son | H01Q 5/328 |
| 2017/0047639 | A1 * | 2/2017 | Lee | H01Q 1/48 |

(Continued)

FOREIGN PATENT DOCUMENTS

| | | | | |
|---|---|---|---|---|
| CN | 106229674 A | | 12/2016 | |
| CN | 107039766 A | | 8/2017 | |
| CN | 107039766 B | * | 7/2019 | H01Q 1/22 |

*Primary Examiner* — Hai V Tran
*Assistant Examiner* — Bamidele A Immanuel
(74) *Attorney, Agent, or Firm* — ScienBiziP, P.C.

(57) ABSTRACT

An antenna structure with multiple frequency capabilities applied to an electronic device includes frame body, first feed point, a first switch point, and second switch point. The frame body has at least one portion made of metal material and defines two gaps. The frame body between gaps form a first radiation portion. The first feed point from a source feeds current and signal to the first radiation portion. The first switch point and the second switch point are located at two ends of the frame body adjacent to the first gap. The first switch point and the second switch point are grounded through a switch circuit.

20 Claims, 12 Drawing Sheets

(56) References Cited

U.S. PATENT DOCUMENTS

| | | | | |
|---|---|---|---|---|
| 2017/0048363 | A1* | 2/2017 | Lee | H04B 1/3833 |
| 2017/0237150 | A1* | 8/2017 | Soh | H01Q 5/371<br>343/702 |
| 2017/0244163 | A1* | 8/2017 | Yoo | H01Q 9/0442 |
| 2017/0244818 | A1* | 8/2017 | Kim | H01Q 1/243 |
| 2017/0302771 | A1* | 10/2017 | Kim | H01Q 1/243 |
| 2017/0365914 | A1* | 12/2017 | Hong | H04B 7/12 |
| 2018/0048050 | A1* | 2/2018 | Sayem | H01Q 5/328 |
| 2018/0090821 | A1* | 3/2018 | Lee | H01Q 5/328 |
| 2018/0261907 | A1* | 9/2018 | Ha | H01Q 9/42 |
| 2018/0261921 | A1* | 9/2018 | Ha | H01Q 1/243 |
| 2018/0277929 | A1* | 9/2018 | Seo | H01Q 5/40 |
| 2018/0358699 | A1* | 12/2018 | Li | H01Q 1/521 |
| 2019/0067797 | A1* | 2/2019 | Jung | H01Q 21/28 |
| 2019/0305431 | A1* | 10/2019 | Islam | H01Q 1/243 |
| 2019/0372223 | A1* | 12/2019 | Hsu | H01Q 1/241 |
| 2019/0386379 | A1* | 12/2019 | Kuo | H01Q 9/0407 |
| 2020/0044311 | A1* | 2/2020 | Gu | H01Q 5/328 |
| 2020/0044315 | A1* | 2/2020 | Gu | H01Q 21/28 |
| 2020/0044346 | A1* | 2/2020 | Gu | H04B 7/0413 |
| 2020/0058992 | A1* | 2/2020 | Wu | H01Q 1/48 |
| 2020/0073445 | A1* | 3/2020 | Kuna | G06F 1/1698 |

* cited by examiner

ANTENNA STRUCTURE AND ELECTRONIC DEVICE USING SAME

FIELD

The subject matter herein generally relates to wireless communications, to an antenna structure, and an electronic device using the antenna structure.

BACKGROUND

Antennas are for receiving and transmitting wireless signals at different frequencies. However, the antenna structure is complicated and occupies a large space in an electronic device, which makes miniaturization of the electronic device problematic.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
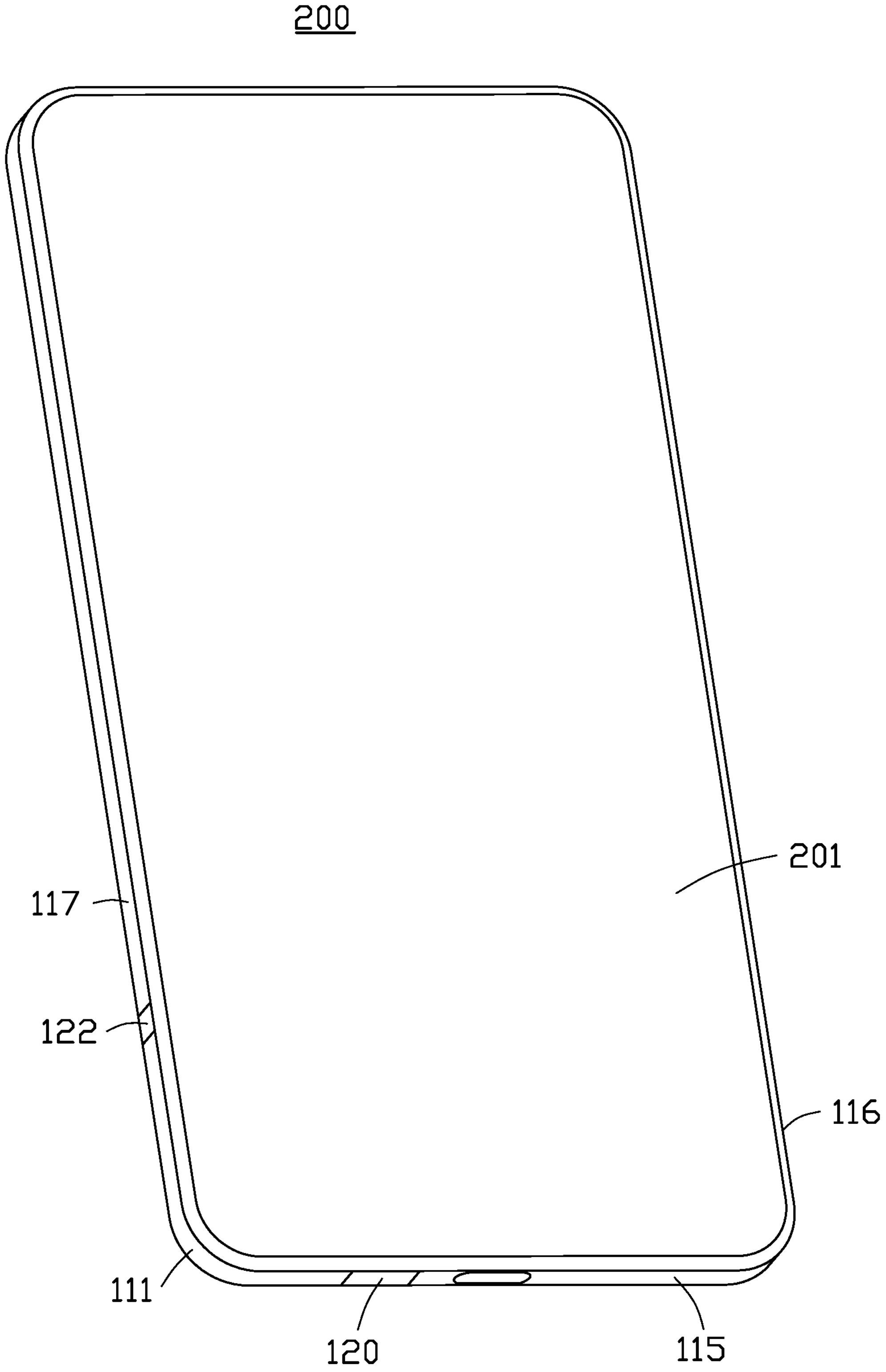
FIG. 1 is a schematic diagram of an embodiment of an antenna structure, applied in an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and an electronic device using same.

Figure 2:
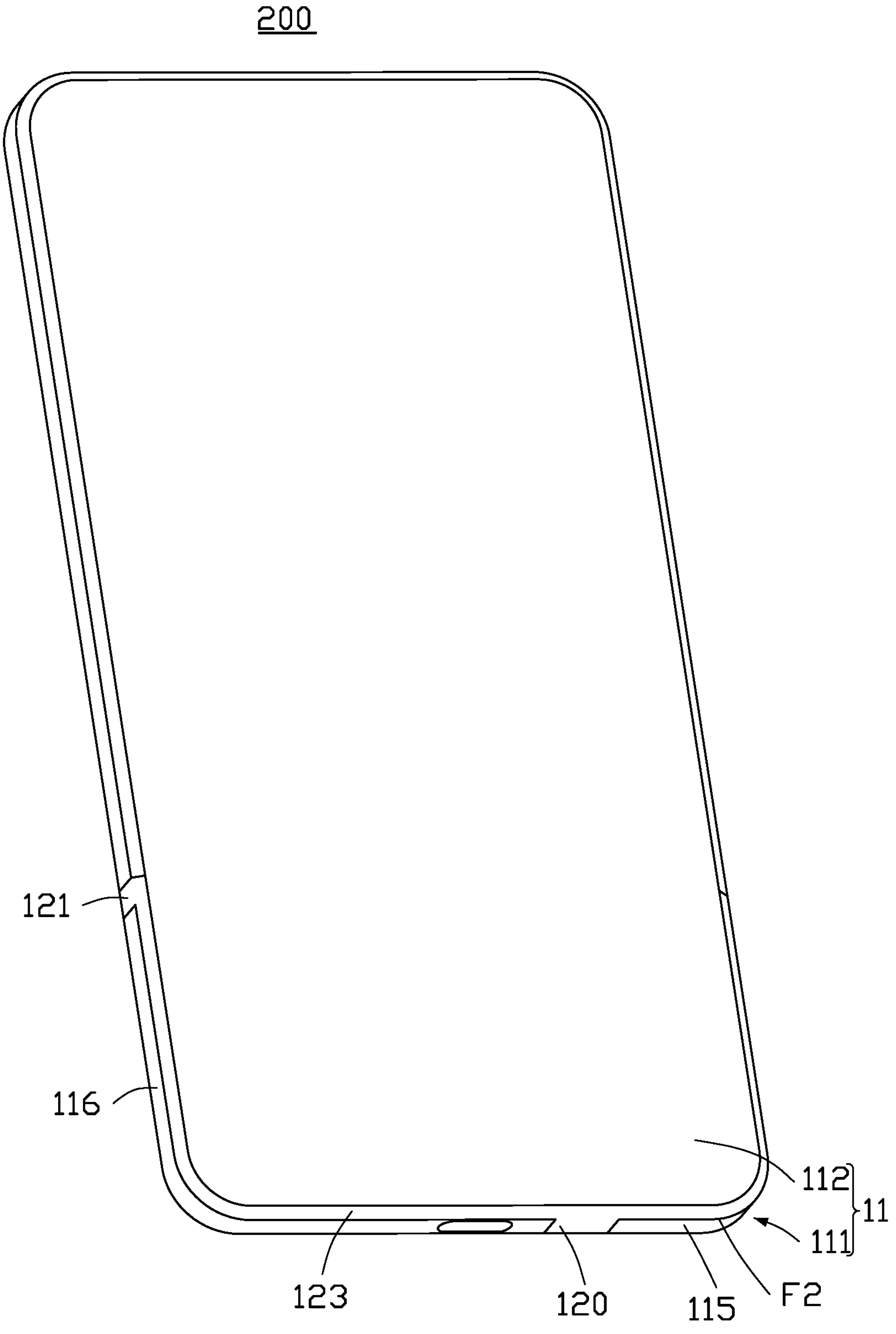
FIG. 2 is similar to FIG. 1, but the electronic device being shown from another angle.
Figure 3:
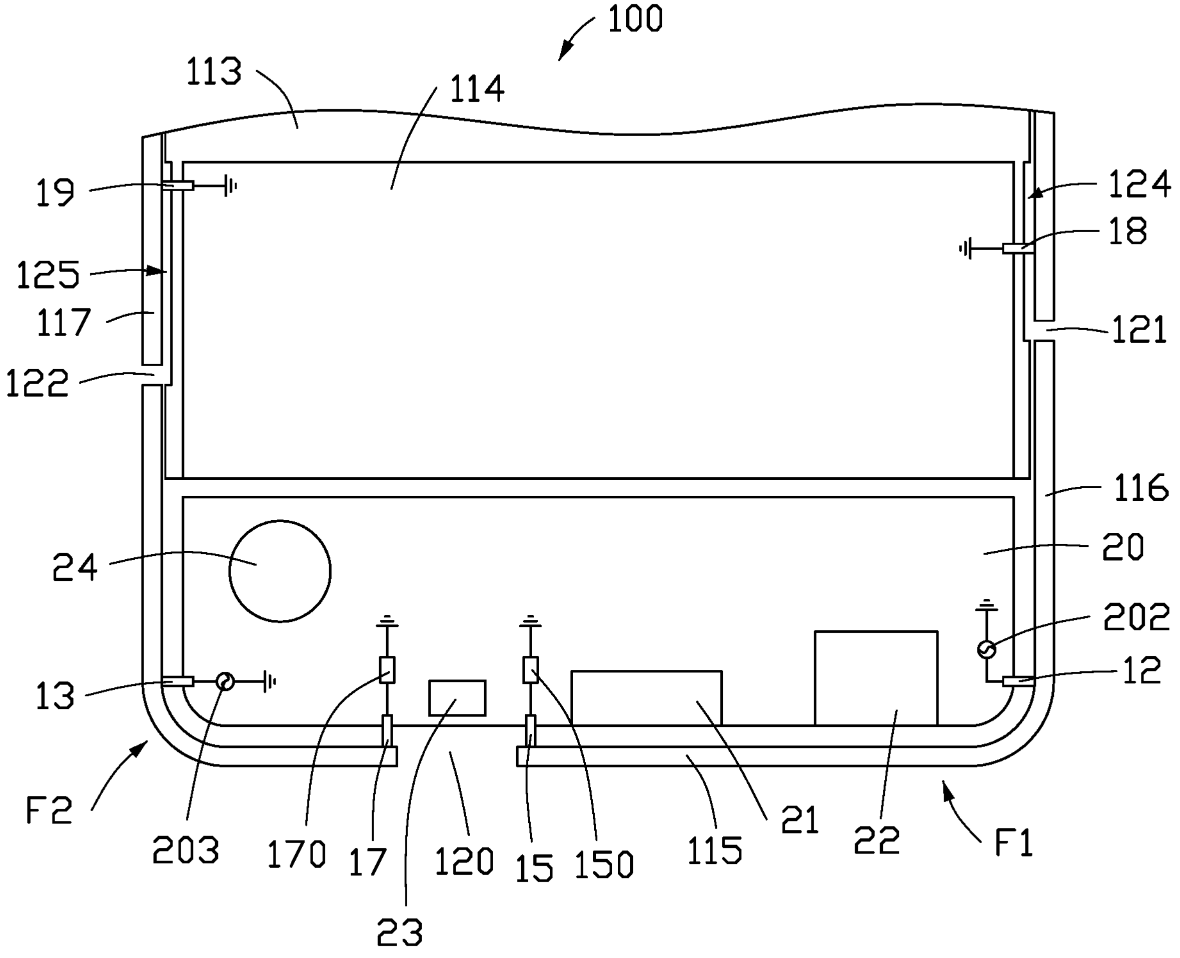
FIG. 3 is a circuit diagram of the antenna structure of FIG. 1.

FIG. 1 and FIG. 2 illustrate an embodiment of an electronic device 200 using an antenna structure 100 (see FIG. 3). The electronic device 200 can be, for example, a mobile phone or a personal digital assistant. The antenna structure 100 can transmit and receive radio waves.

In this embodiment, the electronic device 200 may use one or more of the following communication technologies: BLUETOOTH communication technology, global positioning system (GPS) communication technology, WI-FI communication Technology, global system for mobile communications (GSM) communication technology, wideband code division multiple access (WCDMA) communication technology, long term evolution (LTE) communication technology, 5G communication technology, SUB-6G communication technology, and other future communication technologies.

As illustrated in FIG. 3, the electronic device 100 includes a housing 11 and a display unit 201. The housing 11 at least includes a side frame 111, a back board 112, a system ground plane 113, and a middle frame 114.

The side frame 111 is a structure which is substantially a rectangular frame. The side frame 111 is made of metal or other conductive materials. The back board 112 is positioned at a periphery of the side frame 111. The back board 112 is made of metal or other conductive materials. In other embodiments, the back board 112 can also be made of insulating materials, such as glass, plastic, ceramics and other materials.

In this embodiment, an opening (not shown) is defined on a side of the side frame 111 away the back board 112, for receiving the display unit 201 of the electronic device 200. The display unit 201 has a display plane, and the display plane is exposed through the opening. The display unit 201 can be combined with a touch sensor to form a touch screen. The touch sensor can also be called a touch panel or a touch-sensitive panel.

In this embodiment, the system ground plane 113 is made of metal or other conductive materials. The system ground plane 113 is configured for grounding the antenna structure 100.

The middle frame 114 is substantially a rectangular sheet. The middle frame 114 is made of metal or other conductive materials. A shape and size of the middle frame 114 are slightly less than those of the system ground plane 113. The middle frame 114 is stacked on the system ground plane 113. In this embodiment, the middle frame 114 is a metal sheet. The middle frame 114 is used to support the display unit 201, provide electromagnetic shielding, and improve mechanical strength of the wireless communication device 200.

As illustrated in FIG. 3, the antenna structure 100 at least includes a frame body, a first feed point 12, a second feed point 13, a first switch point 15, and a second switch point 17.

The frame body is made at least partially out of metal material. In this embodiment, the frame body is the side frame 111 of the electronic device 200. The side frame 111 includes at least a first portion 115, a second portion 116, and a third portion 117. The first portion 115 is a bottom end of the electronic device 200. That is, the first portion 115 is a bottom metallic frame of the electronic device 200. The antenna structure 100 constitutes a lower antenna of the electronic device 200. The second portion 116 and the third portion 117 are positioned opposite to each other, they may be equal in length and longer than the first portion 115. The second portion 116 and the third portion 117 are the metallic side frames of the electronic device 200.

The side frame 111 defines at least one gap. In this embodiment, the side frame 111 defines three gaps, namely, a first gap 120, a second gap 121, and a third gap 122. In detail, the first gap 120 is defined in the first portion 115. The second gap 121 is defined in the second portion 116. The third gap 122 is defined in the third portion 117. The third gap 122 is closer to the first gap 120 than it is to the second gap 121.

In this embodiment, the first gap 120, the second gap 121, and the third gap 122 all penetrate and interrupt the side frame 111. The at least one gap divides the side frame 111 into at least two radiation portions. In this embodiment, the first gap 120, the second gap 120, and the third gap 121 divide the side frame 111 into two radiation portions, namely a first radiation portion F1 and a second radiation portion F2. In this embodiment, the side frame 111 between the first gap 120 and the second gap 121 forms the first radiation portion F1. The side frame 111 between the first gap 120 and the third gap 122 forms the second radiation portion F2.

That is, the first radiation portion F1 is formed at a right lower corner of the electronic device 200, namely, the first radiation portion F1 is formed by a portion of the first portion 115 and a portion of the second portion 116. The second radiation portion F2 is formed at a left lower corner of the electronic device 200, namely, the second radiation portion F2 is formed by a portion of the first portion 115 and a portion of the third portion 117. A radiating electrical length of the first radiation portion F1 is greater than that of the second radiation portion F2.

In this embodiment, when a width of either the second gap 121 or the third gap 122 is less than 2 millimeters (mm), radiation efficiency of the antenna structure 100 is affected. Therefore, the widths of the second gap 121 and the third gap 122 are generally not less than 2 mm. Additionally, the greater the width of the first gap 120, the better the efficiency of the antenna structure 100. Then, in this embodiment, considering an overall aesthetic appearance of the electronic device 200 in addition to radiation efficiency of the antenna structure 100, the respective widths of the second gap 121 and the third gap 122 can be set to 2 mm. A width of the first gap 120 can be set to 7.25 mm.

In this embodiment, the first feed point 12 is positioned on the first radiation portion F1 and on the second portion 116. The first feed point 12 may be electrically connected to a first signal feed source 202 by means of an elastic sheet, a microstrip line, a strip line, or a coaxial cable, to feed current and signals to the first radiation portion F1.

The second feed point 13 is positioned on the second radiation portion F2 and on the third portion 117. The second feed point 13 may be electrically connected to a second signal feed source 203, to feed current and signals to the second radiation portion F2.

The first switch point 15 is arranged on the first radiation portion F1 and on the first portion 115. The second switch point 17 is arranged on the second radiation portion F2 and on the first portion 115. In this embodiment, the first switch point 15 is disposed at the end of the first radiation portion F1 close to the first gap 120, and is grounded through a first switch circuit 150. The second switch point 17 is disposed at the end of the second radiation portion F2 close to the first gap 120 and is grounded through a second switch circuit 170. That is, in this embodiment, the first switch point 15 and the second switch point 17 are arranged in the first portion 115 at intervals, are located at the two ends of the first gap 120, and are grounded through a switch circuit.

Figure 4:
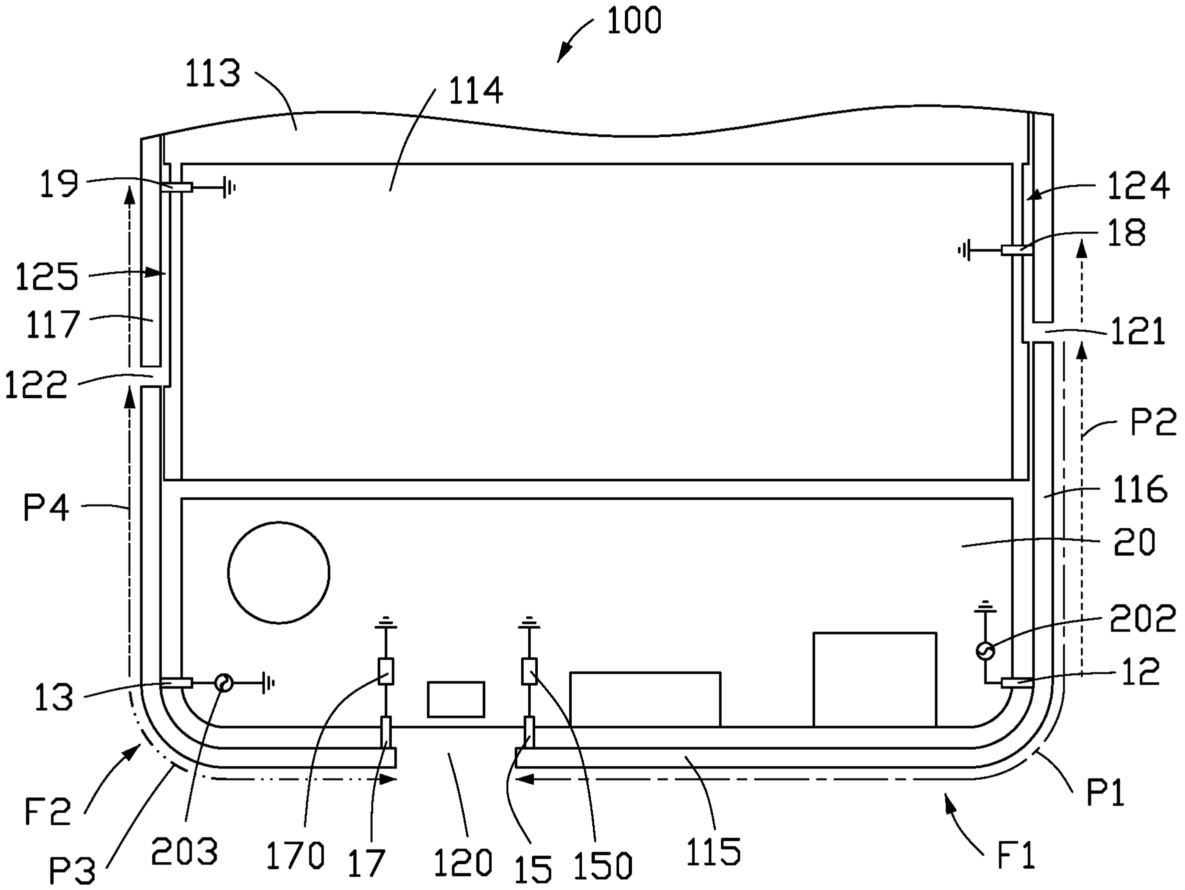
FIG. 4 is a current path distribution graph of the antenna structure of FIG. 3.

FIG. 4 illustrates current paths of the antenna structure 100. When the first feed point 12 supplies a current, the current flows through the first radiation portion F1, towards the first gap 120 (path P1), to excite a first working mode and generate a radiation signal in a first radiation frequency band. When the first feed point 12 supplies a current, the current also flows through the portion of the first radiation portion F1 located at the second portion 116, towards the second gap 121 (path P2), to excite a second working mode and generate a radiation signal in a second radiation frequency band.

When the second feed point 13 supplies a current, the current will flow through the portion of the second radiation portion F2 located at the first portion 115, towards the first gap 120 (path P3), to excite a third working mode and generate a radiation signal in a third radiation frequency band. When the second feed point 13 supplies a current, the current also flows through the portion of the second radiation portion F2 located at the third portion 117, towards the third gap 122 (path P4), to excite a fourth working mode and generate a radiation signal in a fourth radiation frequency band.

In this embodiment, the first working mode includes a Long Term Evolution Advanced (LTE-A) low frequency mode. The second working mode includes an LTE-A middle frequency mode and an LTE-A high-frequency mode. The third working mode includes an LTE-A middle frequency mode and an ultra-middle frequency (UMB) mode. The fourth working mode includes an LTE-A middle frequency mode and an LTE-A high-frequency mode.

Figure 5:
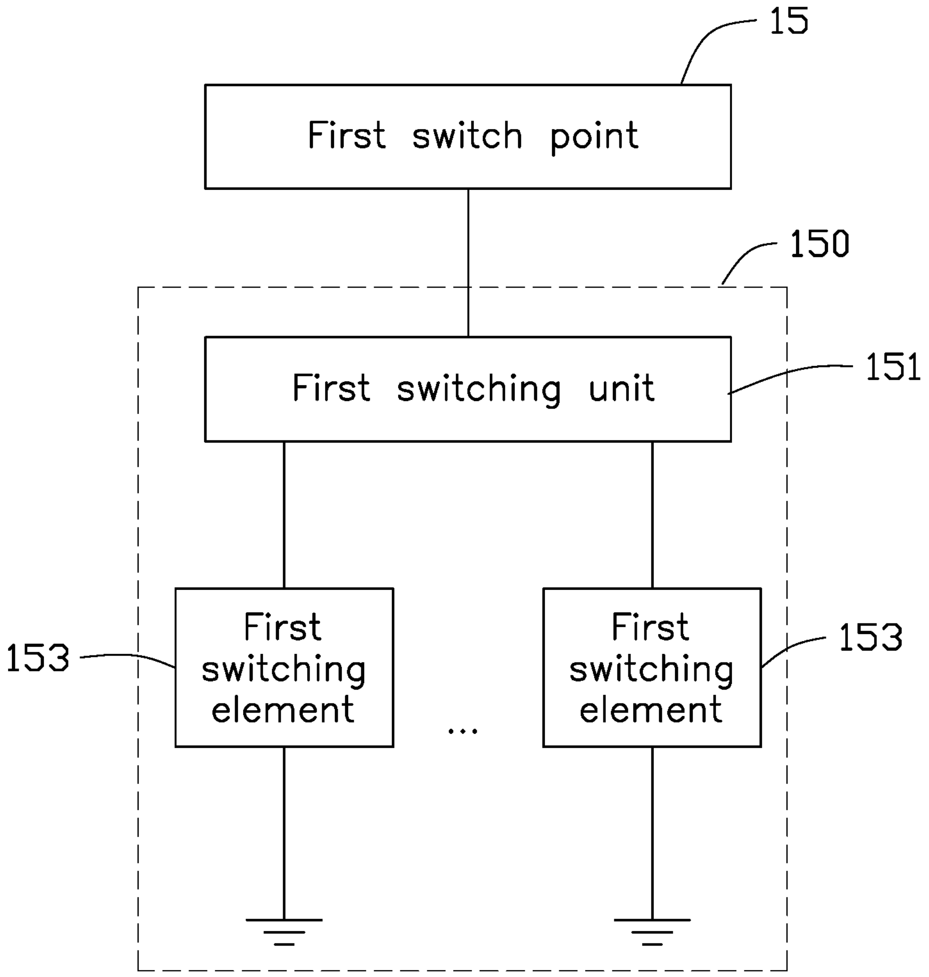
FIG. 5 is a circuit diagram of a first switch circuit of the antenna structure of FIG. 3.

As illustrated in FIG. 5, the first switch circuit 150 includes a first switching unit 151 and a plurality of first switching elements 153. The first switching unit 151 may be a single pole single throw switch, a single pole double throw switch, a single pole three throw switch, a single pole four throw switch, a single pole six throw switch, a single pole eight throw switch, or the like. The first switching unit 151 is electrically connected to the first switch point 15, thereby achieving connection with the first radiation portion F1. The first switching elements 153 can be inductors, capacitors, or a combination of them. The first switching elements 153 are connected in parallel to each other. One end of each first switching element 153 is electrically connected to the first switching unit 151. The other end of each first switching element 153 is grounded. The first switching unit 151 can switch between different first switching elements 153 to achieve connection with the first radiation portion F1, thereby the frequencies of the first radiation frequency band (the low frequency band) can be adjusted. Then, the low frequency band can cover 600-960 MHz.

In this embodiment, a circuit structure and a working principle of the second switch circuit 170 are similar to those of the first switch circuit 150, except that the second switch circuit 170 is used to adjust the frequencies of the third radiation frequency band. The middle frequency deviation of the third radiation frequency band can be controlled to cover the UMB frequency band (1427-1510 MHz, applied in Japan), which will not be repeated here.

As illustrated in FIG. 2, an edge of the back board 112 near the side frame 111 defines a slot 123. The slot 123 is substantially U-shaped. The slot 123 is defined on the side of the back board 112 close to the first portion 115, and extends in directions of the second portion 116 and the third portion 117. The slot 123 communicates with the first gap 120, the second gap 121, and the third gap 122.

In this embodiment, the first gap 120, the second gap 121, the third gap 122, and the slot 123 are all filled with an insulating material (such as plastic, rubber, glass, wood, ceramic, etc., not being limited to these).

In this embodiment, as illustrated in FIG. 3, the two ends of the system ground plane 113 adjacent to the middle frame 114 respectively define a first slit 124 and a second slit 125 along a direction parallel to the second portion 116 and close to the first portion 115. The first slit 124 and the second slit 125 are arranged in parallel and respectively communicate with the second gap 121 and the third gap 122.

In this embodiment, the antenna structure 100 further includes a first ground point 18 and a second point 19. The first ground point 18 is positioned on the second portion 116 of the side frame 111 corresponding to the first slit 124. One end of the first ground point 18 crosses the first slit 124 and is grounded. The second ground point 19 is positioned on the third portion 117 of the frame 111 corresponding to the second slit 125. One end of the second ground point 19 crosses the second slit 125 and is grounded.

As illustrated in FIG. 4, when the first feed point 12 supplies a current, to flow through the portion of the first radiation portion F1 located in the second portion 116 and to the second gap 121, the current is also coupled to the first slit 124 through the second gap 121. Then, the first slit 124 couples and resonates a mode with tunability and better antenna efficiency, so that the frequencies of the middle and high frequencies of the first radiation portion F1 can also cover 1710-2690 MHz.

At the same time, when the second feed point 13 supplies a current, to flow through the portion of the second radiation portion F2 located in the third portion 117 and to the third gap 122, the current is also coupled to the second slit 125 through the third gap 122. In this way, the second slit 125 couples and resonates a mode with tunability and better antenna efficiency, so that the frequencies of the second radiation portion F2 can also cover 1427-2690 MHz.

Figure 6:
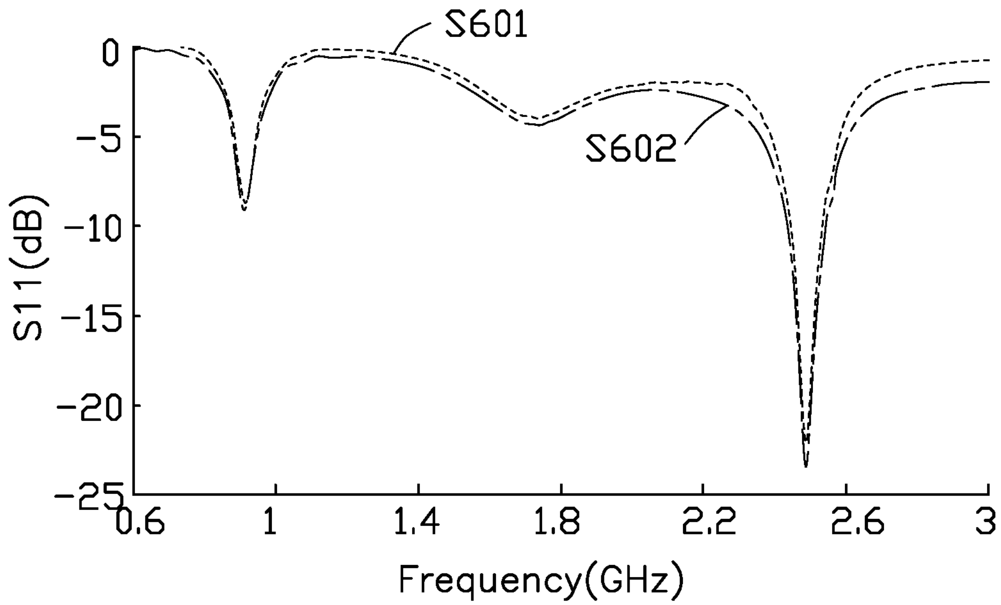
FIG. 6 is a scattering parameter graph of the antenna structure of FIG. 3 working in a frequency band of Long Term Evolution Advanced (LTE-A) B8, showing performance with first slit (124 of FIG. 3) defined (S602) and performance without (S601).

FIG. 6 is a graph of scattering parameters (S parameters), when the first slit 124 is defined or is not defined, and the antenna structure 100 works at a frequency band of LTE B8. A curve S601 is an S11 value when the first slit 124 is not defined and the antenna structure 100 works at the frequency band of LTE B8. A curve S602 is an S11 value when the first slit 124 is defined and the antenna structure 100 works at the frequency band of LTE B8.

Figure 7:
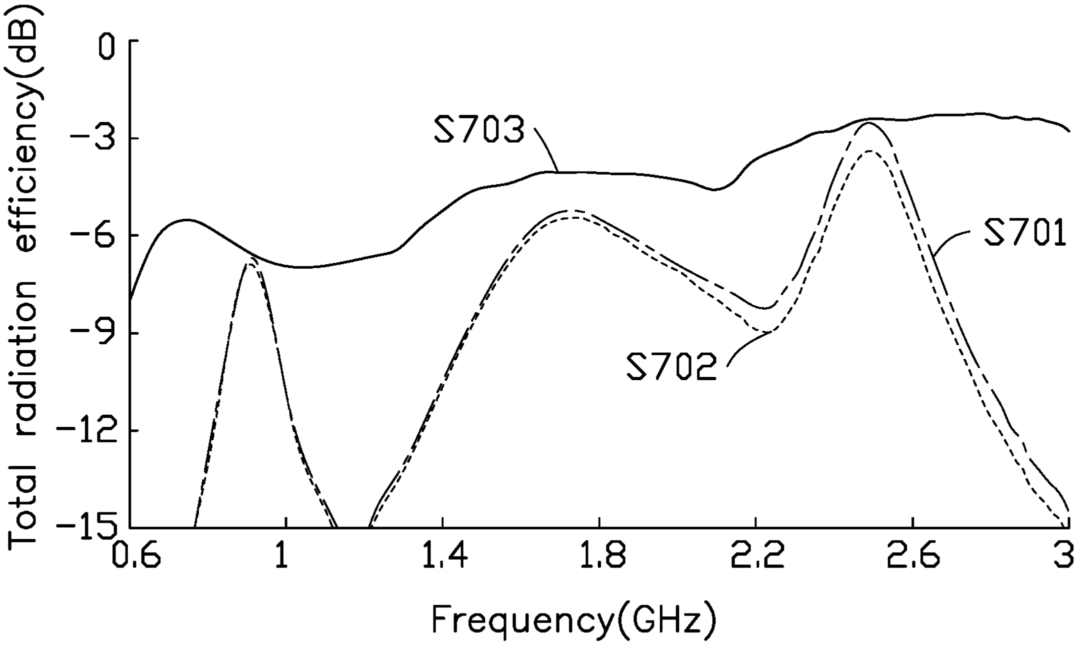
FIG. 7 is a total radiation efficiency graph of the antenna structure of FIG. 3 working in the frequency band of LTE-A B8, showing performance with the first slit defined (S702) and performance without (S701).

FIG. 7 is a graph of total radiation efficiency, when the first slit 124 is defined or is not defined, and the antenna structure 100 works at a frequency band of LTE B8. A curve S701 is a total radiation efficiency when the first slit 124 is not defined and the antenna structure 100 works at the frequency band of LTE B8. A curve S702 is a total radiation efficiency when the first slit 124 is defined and the antenna structure 100 works at the frequency band of LTE B8. A curve S703 is a total radiation efficiency of the first radiation portion F1 of the antenna structure 100.

Figure 8:
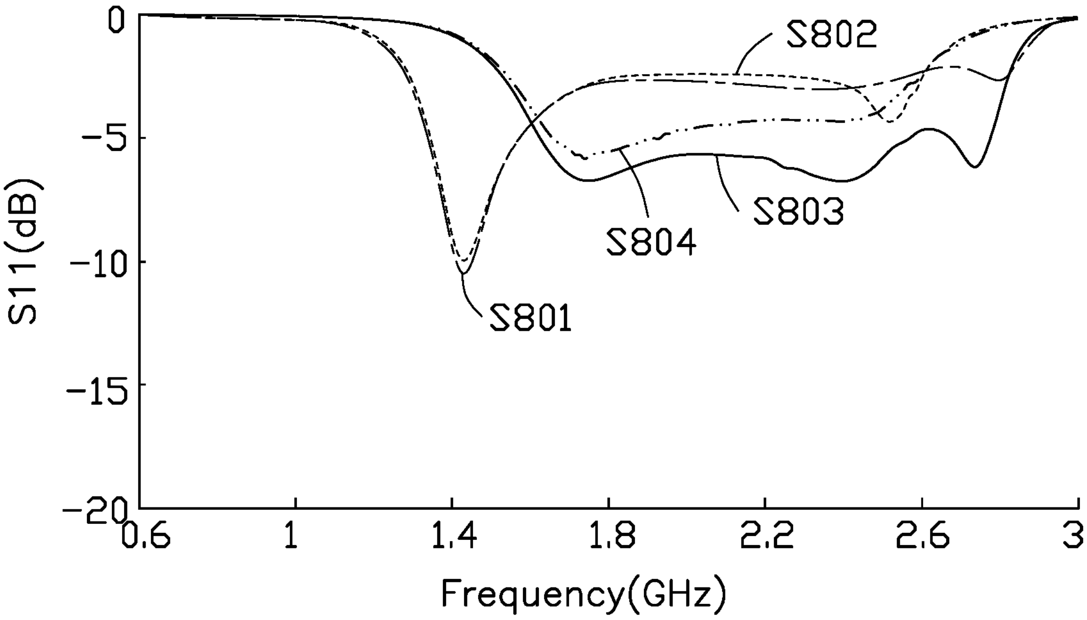
FIG. 8 is a scattering parameter graph of a second radiation portion of the antenna structure of FIG. 3 showing performance with second slit (125 of FIG. 3) defined (S801, S803) and performance without (S802, S804).

FIG. 8 is a graph of scattering parameters (S parameters) of the second radiation portion F2 of the antenna structure 100, when the second slit 125 is defined or is not defined. A curve S801 is an S11 value when the second slit 125 is defined and the second radiation portion F2 works at a frequency band of UMB. A curve S802 is an S11 value when the second slit 125 is not defined and the second radiation portion F2 works at a frequency band of UMB. A curve S803 is an S11 value when the second slit 125 is defined and the second radiation portion F2 works at middle and high frequency bands. A curve S804 is an S11 value when the second slit 125 is not defined and the second radiation portion F2 works at the middle and high frequency bands.

Figure 9:
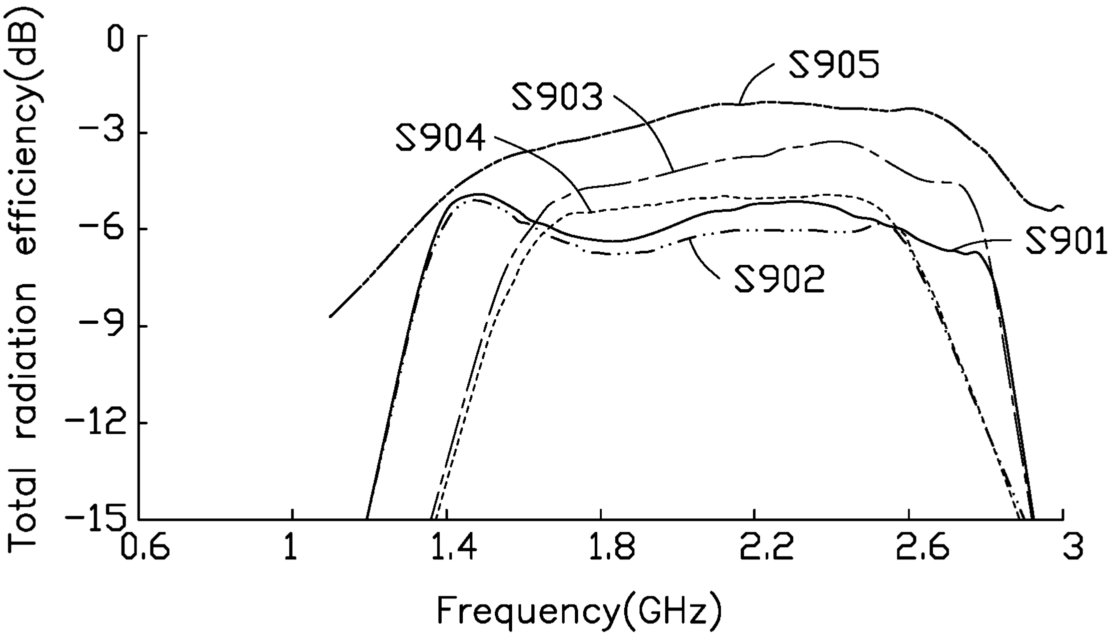
FIG. 9 is a total radiation efficiency graph of the second radiation portion of the antenna structure of FIG. 3 showing performance with the second slit defined (S901, S903) and performance without (S902, S904).

FIG. 9 is a graph of total radiation efficiency of the second radiation portion F2 of the antenna structure 100, when the second slit 125 is defined or is not defined. A curve S901 is a total radiation efficiency when the second slit 125 is defined and the second radiation portion F2 works at a frequency band of UMB. A curve S902 is a total radiation efficiency when the second slit 125 is not defined and the second radiation portion F2 works at a frequency band of UMB. A curve S903 is a total radiation efficiency when the second slit 125 is defined and the second radiation portion F2 works at middle and high frequency bands. A curve S904 is a total radiation efficiency when the second slit 125 is not defined and the second radiation portion F2 works at the middle and high frequency bands.

Figure 10:
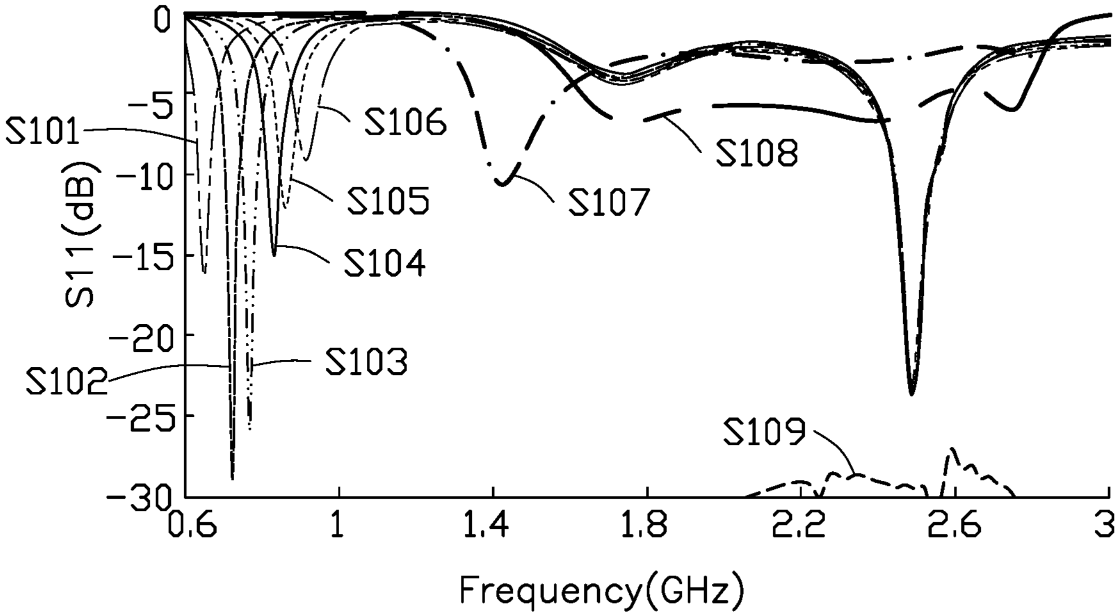
FIG. 10 is a scattering parameter graph of the antenna structure of FIG. 3.

FIG. 10 is a graph of scattering parameters (S parameters) of the antenna structure 100. A curve S101 is an S11 value when the antenna structure 100 works in the frequency band of LTE-A Band17. A curve S102 is an S11 value when the antenna structure 100 works in the frequency band of LTE-A Band17. A curve S103 is an S11 value when the antenna structure 100 works in the frequency band of LTE-A Band13. A curve S104 is an S11 value when the antenna structure 100 works in the frequency band of LTE-A Band20. A curve S105 is an S11 value when the antenna structure 100 works in the frequency band of LTE-A Band8. A curve S106 is an S11 value when the antenna structure 100 works in the frequency band of LTE-A Band8. A curve S107 is an S11 value when the antenna structure 100 works in the frequency band of UMB. A curve S108 is an S11 value when the antenna structure 100 works in middle and high frequency bands. A curve S109 is an S11 value of the antenna structure 100.

Figure 11:
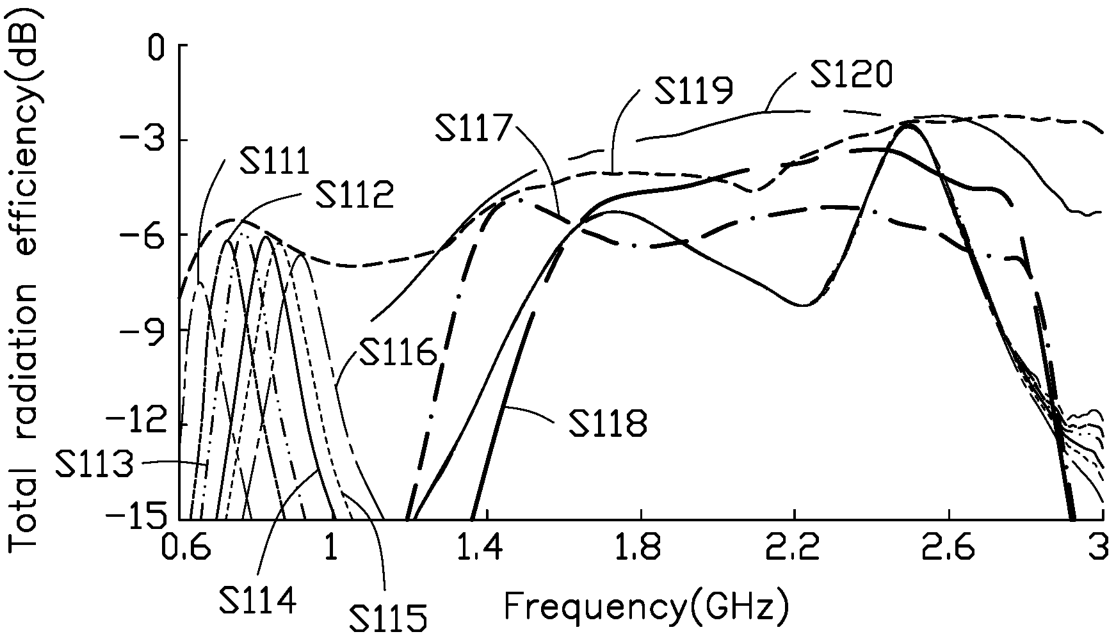
FIG. 11 is a radiation efficiency graph of the antenna structure of FIG. 3.

FIG. 11 is a graph of total radiation efficiency of the antenna structure 100. A curve S111 is a total radiation efficiency when the antenna structure 100 works in the frequency band of LTE-A Band17. A curve S112 is a total radiation efficiency when the antenna structure 100 works in the frequency band of LTE-A Band17. A curve S113 is a total radiation efficiency when the antenna structure 100 works in the frequency band of LTE-A Band13. A curve S114 is a total radiation efficiency when the antenna structure 100 works in the frequency band of LTE-A Band20. A curve S115 is a total radiation efficiency when the antenna structure 100 works in the frequency band of LTE-A Band5.

A curve S116 is a total radiation efficiency when the antenna structure 100 works in the frequency band of LTE-A Band8. A curve S117 is a total radiation efficiency when the antenna structure 100 works in the frequency band of UMB. A curve S118 is a total radiation efficiency when the antenna structure 100 works in middle and high frequency bands. A curve S119 is a total radiation efficiency of the first radiation portion of the antenna structure 100. A curve S119 is a total radiation efficiency of the second radiation portion of the antenna structure 100.

FIG. 6 to FIG. 11 show that the antenna structure 100 is provided with the first switch circuit 150, to switch between various low frequency modes of the antenna structure 100. This improves the low frequency bandwidth and gives better antenna effectiveness. Then, the low frequency band of the antenna structure 100 can cover frequency bands of B71/B17/B13/B20/B5/B8. In addition, by providing the slits, that is, the first slit 124 and the second slit 125, energy can be coupled to resonate for additional modes, thereby effectively increasing the bandwidth of the middle and high frequency bands. Specifically, the middle and high frequency radiation by the first radiation portion F1 (that is, the radiation occurring between the first feed point 12 and the second gap 121) works with the first slit 124. The middle and high frequency radiation by the second radiation portion F2 (that is, the radiation occurring between the second feed point 13 and the third gap 122) works with the second slit 125 to effectively couple energy for resonance which generates additional modes, thereby effectively increasing the frequency bandwidth of middle and high frequency bands. Thereby, the antenna structure 100 can cover the 4G communication frequency bands commonly used in the world, such as the frequency band of 1710-2690 MHz. Furthermore, in comparison with the absence of the first slit 124 and the second slit 125 in the prior art, the antenna structure 100 of the disclosure with the first and second slits 124 and 125 improves antenna efficiency in the resonant mode by 2-3 dB.

In this embodiment, the first switch circuit 150 and the second switch circuit 170 are located on either side of the first slot 120, and can be used to adjust a resonance frequency of the corresponding radiation portion, further improving a frequency coverage of the antenna structure 100. For example, the first switch circuit 150 is used to adjust the low frequency band of the first radiation portion F1. The second switch circuit 170 is used to adjust the middle and high frequency bands of the second radiation portion F2.

In addition, the first switch circuit 150 and the second switch circuit 170 are also used to increase isolation between the two radiation portions. Generally, when two radiation portions work in the same frequency band, mutual interference may be generated between them. In this embodiment, by providing the first switch circuit 150 and the second switch circuit 170, when one of the two radiation portions, such as the first radiation portion F1, works in a certain frequency band (such as the middle and high frequency bands), the switch circuit (such as the second switch circuit 170) can be used to switch another radiation portion (for example, the operating frequency band of the second radiation portion F2), thereby effectively improving the isolation between the two radiation portions. In terms of switching to a certain frequency by directly setting the antenna tuner at the feeding point in the prior art, the cost of the antenna structure 100 of this disclosure is lower.

In this embodiment, since the middle and high frequency radiation of the first radiation portion F1 is located in the second portion 116, and the middle and high frequency radiation of the second radiation portion F2 is located in the third portion 117, the two radiation elements are thereby arranged at intervals. That is, a low frequency radiation is arranged between the two middle and high frequency radiations, so that the isolation between them is improved.

In this embodiment, the antenna structure 100 can be adapted to an electronic device 200 having a full screen, a narrow frame, a folding screen, or a dual screen.

In this embodiment, the first gap 120 is defined on the first portion 115, which makes it less susceptible to the close proximity of the hand of a user when holding device 200 in his hand.

As illustrated in FIG. 3, in this embodiment, the electronic device 200 further includes a circuit board 20 and at least one electronic component. In this embodiment, the circuit board 20 is received in a space formed by the side frame 111, the back board 112, and the middle frame 114. The circuit board 20 can be made of dielectric materials, such as epoxy resin glass fiber (FR4). The first feed point 202, the second feed point 203, the first switch circuit 150, and the second switch circuit 170 are all positioned on the circuit board 20.

In this embodiment, the electronic device 200 includes at least four electronic components, namely first to fourth electronic components 21-24. The first to fourth electronic components 21-24 are located on the circuit board 20.

In this embodiment, the first electronic component 21 is a Universal Serial Bus (USB) interface module. The first electronic component 21 is located between the first gap 120 and the second portion 116. The second electronic component 22 is a loudspeaker. The second electronic component 22 is disposed between the first electronic component 21 and the second portion 116. The third electronic component 23 is a microphone. The third electronic component 23 is disposed corresponding to the first gap 120. The fourth electronic component 24 is a vibrating-alert device (Vibrator). The fourth electronic component 24 is disposed between the first gap 120 and the third portion 117.

Figure 12:
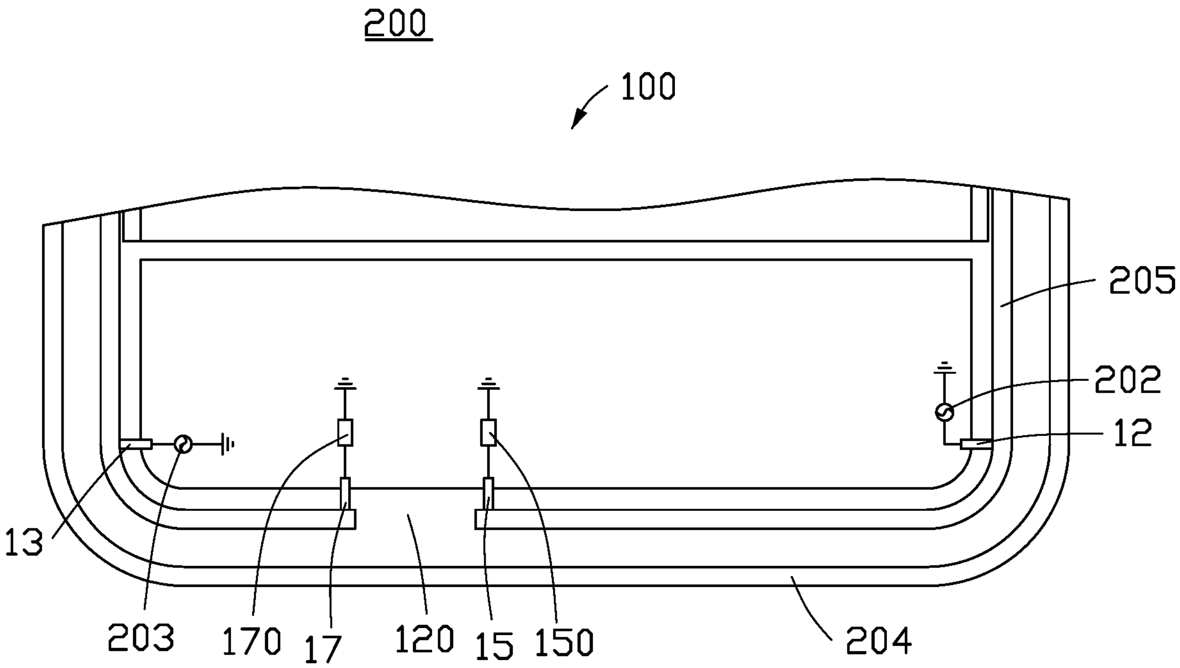
FIG. 12 is a schematic diagram of another embodiment of an electronic device.

As described above, in this embodiment, the frame body of the antenna structure 100 is directly formed by the side frame 111 of the electronic device 200. That is, the housing (i.e., frame) of the electronic device 200 is made of metal, and the antenna structure 100 makes use of such metal frame. Of course, in other embodiments, the antenna structure 100 is not limited to being a metal frame which is made to function as an antenna, and it may also be other antenna forms, such as a mode decoration antenna (MDA). For example, as illustrated in FIG. 12, when the antenna structure 100 is an MDA antenna, a metallic member 205 in a shell 204 of the electronic device 200 can be used as a frame body to realize the radiation function. The shell 204 of the electronic device 200 is made of insulating materials such as plastic, glass, or ceramic, and the metallic member 205 is integrated with the shell 204 by in-mold injection molding.

The antenna structure 100 defines at least one gap (such as the first gap 120, the second gap 121, and the third gap 122) on the side frame 111, to create at least two radiation portions from the side frame 111. The antenna structure 100 also provides the first switch point 15 and the second switch point 17 at the two ends of the first gap 120. In this way, multiple frequency bands, such as a low frequency band, a middle frequency band, and a high frequency band can be covered by different switching methods, which meets the carrier aggregation (CA) application of LTE-A. Compared with that of a general metal back, the radiation of the antenna structure 100 can achieve wider frequencies. Specifically, the antenna structure 100 can cover 600-960 MHz at low frequency band, 1427-15100 MHz at ultra-middle frequency band, 1710-2170 MHz at middle frequency band, and 2300-2690 MHz at high frequency band.

Furthermore, by setting in place the first switch point 15 and the second switch point 17, the mutual coupling state between the two radiation portions of the antenna structure 100 can be effectively controlled, and isolation of the two radiation portions can be effectively improved and the efficiency of each one is improved.

At the same time, by providing the first slit 124 and the second slit 125, independent modes with resonance tunability and good antenna efficiency can be generated through coupling. The antenna structure 100 of this disclosure increases the middle frequency bandwidth, has better antenna efficiency, has MIMO characteristics, and can also cover the frequency bands of global frequency bands.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure applied to an electronic device, the antenna structure comprising:

a frame body with at least one portion made of metal material, wherein the frame body defines a first gap and a second gap, the frame body between the first gap and the second gap form a first radiation portion;

a first feed point positioned on the first radiation portion and being electrically connected to a first feed source for feeding current and signal to the first radiation portion;

a first switch point; and a second switch point;

wherein the frame body further defines a third gap, the frame body between the first gap and the third gap forms a second radiation portion, wherein the first switch point is disposed at a first end of the first radiation portion close to the first gap, and is grounded through a first switch circuit, the second switch point is disposed at a second end of the second radiation portion close to the first gap and is grounded through a second switch circuit.

2. The antenna structure of claim 1, wherein the third gap is closer to the first gap than the second gap;

wherein the antenna structure further comprises a second feed point, the second feed point is positioned on the second radiation portion and is electrically connected to a second feed source for feeding current and signal to the second radiation portion.

3. The antenna structure of claim 2, wherein a radiating electrical length of the first radiation portion is longer than that of the second radiation portion;

wherein a radiating electrical length of the frame body between the first feed point and the first gap is longer than that of the frame body between the first feed point and the second gap;

wherein a radiating electrical length of the frame body between the second feed point and the first gap is longer than that of the frame body between the second feed point and the third gap.

4. The antenna structure of claim 2, wherein the second switch point is positioned on the second radiation portion and positioned on an end portion of the frame body close to the first gap;

wherein a circuit structure of the second switch circuit is same with that of the first switch circuit.

5. The antenna structure of claim 2, wherein the electronic device comprises a system ground plane, two sides of the system ground plane define a first slit and a second slit, the first slit is parallel with the second slit, the first slit communicates with the second gap, and the second slit communicates with the third gap.

6. The antenna structure of claim 5, further comprising a first ground point and a second ground point, wherein the first ground point is positioned on the portion of the frame body corresponding to the first slit and crosses the first slit to be grounded;

wherein the second ground point is positioned on the portion of the frame body corresponding to the second slit and crosses the second slit to be grounded.

7. The antenna structure of claim 1, wherein the frame body is a metallic frame of the electronic device.

8. The antenna structure of claim 1, wherein the frame body is positioned in a shell of the electronic device, the shell is made of insulating materials, and the frame body is integrated with the shell by in-mold injection molding.

9. The antenna structure of claim 2, wherein when the first feed point supplies a current, the first radiation portion activates LTE-A low, middle, and high frequency mode;

wherein when the second feed point supplies a current, the second radiation portion activates LTE-A middle frequency mode, ultra-middle frequency (UMB) mode, and LTE-A high frequency mode.

10. The antenna structure of claim 6, wherein when the first feed point supplies a current, the current is coupled to the first slit through the second gap, the first slit couples and resonates to adjust frequencies of the first radiation portion;

wherein when the second feed point supplies a current, the current is coupled to the second slit through the third gap, the second slit couples and resonates to adjust frequencies of the second radiation portion.

11. An electronic device, comprising:

an antenna structure comprising:

a frame body with at least one portion made of metal material, wherein the frame body defines a first gap and a second gap, the frame body between the first gap and the second gap form a first radiation portion;

a first feed point positioned on the first radiation portion and being electrically connected to a first feed source for feeding current and signal to the first radiation portion;

a first switch point; and a second switch point;

wherein the frame body further defines a third gap, the frame body between the first gap and the third gap forms a second radiation portion, wherein the first switch point is disposed at a first end of the first radiation portion close to the first gap, and is grounded through a first switch circuit, the second switch point is disposed at a second end of the second radiation portion close to the first gap and is grounded through a second switch circuit.

12. The electronic device of claim 11, further comprising a back board, the frame body is positioned at a periphery of the back board, an edge of the back board close to the frame body defines a slot, the first gap and the second gap both communicate with the slot.

13. The electronic device of claim 11, wherein the third gap is closer to the first gap than the second gap;

wherein the antenna structure further comprises a second feed point, the second feed point is positioned on the second radiation portion and is electrically connected to a second feed source for feeding current and signal to the second radiation portion;

wherein a radiating electrical length of the first radiation portion is longer than that of the second radiation portion;

wherein a radiating electrical length of the frame body between the first feed point and the first gap is longer than that of the frame body between the first feed point and the second gap;

wherein a radiating electrical length of the frame body between the second feed point and the first gap is longer than that of the frame body between the second feed point and the third gap.

14. The electronic device of claim 13, wherein the second switch point is positioned on the second radiation portion and positioned on an end portion of the frame body close to the first gap;

wherein a circuit structure of the second switch circuit is same with that of the first switch circuit.

15. The electronic device of claim 13, wherein the electronic device comprises a system ground plane, two sides of the system ground plane define a first slit and a second slit, the first slit is parallel with the second slit, the first slit communicates with the second gap, and the second slit communicates with the third gap.

16. The electronic device of claim 15, wherein the antenna structure further comprises a first ground point and a second ground point, the first ground point is positioned on the portion of the frame body corresponding to the first slit and crosses the first slit to be grounded;

wherein the second ground point is positioned on the portion of the frame body corresponding to the second slit and crosses the second slit to be grounded.

17. The electronic device of claim 11, wherein the frame body is a metallic frame of the electronic device.

18. The electronic device of claim 11, further comprising a shell, wherein the frame body is positioned in the shell, the shell is made of insulating materials, and the frame body is integrated with the shell by in-mold injection molding.

19. The electronic device of claim 13, wherein when the first feed point supplies a current, the first radiation portion activates LTE-A low, middle, and high frequency mode;

wherein when the second feed point supplies a current, the second radiation portion activates LTE-A middle frequency mode, ultra-middle frequency (UMB) mode, and LTE-A high frequency mode.

20. The electronic device of claim 16, wherein when the first feed point supplies a current, the current is coupled to the first slit through the second gap, the first slit couples and resonates to adjust frequencies of the first radiation portion;

wherein when the second feed point supplies a current, the current is coupled to the second slit through the third gap, the second slit couples and resonates to adjust frequencies of the second radiation portion.

* * * * *